United States Patent
Hong

(10) Patent No.: US 7,051,132 B2
(45) Date of Patent: May 23, 2006

(54) BUS SYSTEM AND PATH DECISION METHOD THEREFOR

(75) Inventor: Jin-seok Hong, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 209 days.

(21) Appl. No.: 10/342,295

(22) Filed: Jan. 15, 2003

(65) Prior Publication Data

US 2003/0158986 A1   Aug. 21, 2003

(30) Foreign Application Priority Data

Jan. 15, 2002   (KR) ................................. 2002-2264

(51) Int. Cl.
*G06F 13/00* (2006.01)

(52) U.S. Cl. ...................... 710/107; 710/240; 710/241; 710/113; 710/114; 710/115; 710/116

(58) Field of Classification Search ................ 710/107, 710/111, 113–116, 240–244, 100, 305; 709/251
See application file for complete search history.

(56) References Cited

U.S. PATENT DOCUMENTS

| | | | | | |
|---|---|---|---|---|---|
| 4,821,174 | A | * | 4/1989 | Webb et al. ................. | 710/107 |
| 4,884,192 | A | * | 11/1989 | Terada et al. ................ | 709/251 |
| 5,555,540 | A | * | 9/1996 | Radke ......................... | 370/462 |
| 5,734,836 | A | * | 3/1998 | Fujishima et al. .......... | 709/251 |
| 5,751,699 | A | * | 5/1998 | Radke ......................... | 370/258 |
| 5,884,046 | A | * | 3/1999 | Antonov ...................... | 709/238 |
| 5,886,992 | A | * | 3/1999 | Raatikainen et al. ....... | 370/410 |
| 5,933,610 | A | * | 8/1999 | Chambers et al. .......... | 711/113 |
| 6,330,245 | B1 | * | 12/2001 | Brewer et al. ............... | 370/424 |
| 6,343,331 | B1 | * | 1/2002 | Stirling ....................... | 709/251 |
| 6,377,582 | B1 | * | 4/2002 | Neiger ........................ | 370/406 |
| 6,470,407 | B1 | * | 10/2002 | Losi ............................ | 710/264 |
| 6,493,784 | B1 | * | 12/2002 | Kamimura et al. ......... | 710/309 |
| 6,662,256 | B1 | * | 12/2003 | Foo ............................. | 710/305 |

(Continued)

FOREIGN PATENT DOCUMENTS

JP   51-141559   12/1976

(Continued)

OTHER PUBLICATIONS

Child, Jeff, "PLX Reveals Switchlike PCI Dual-Ring Scheme," Dec. 18, 2000, Electronic Engineering Times, p. 77-78.*

(Continued)

*Primary Examiner*—Rehana Perveen
*Assistant Examiner*—Nimesh Patel
(74) *Attorney, Agent, or Firm*—Sughrue Mion, PLLC

(57) ABSTRACT

A bus system and a method of deciding a data transmission path are provided. The bus system includes a plurality of functional blocks; a ring bus which transmits data in a single direction; an arbiter which generates a bus grant signal according to a predetermined algorithm in response to a bus request from one of the functional blocks; and a plurality of bus connectors each of which connects a corresponding functional block to the ring bus, transmits data from the corresponding functional block to the ring bus, and transmits data from the ring bus to the corresponding functional block. The method includes synthesizing and laying out a bus system, simulating a case where a short-cut bus is used when data is transmitted between functional blocks and a case where the short-cut bus is not used, and generating a bus selection table, to be referred to for selection of a bus, based on the simulation results.

29 Claims, 12 Drawing Sheets

U.S. PATENT DOCUMENTS 6,820,158 B1 * 11/2004 Lee et al. .................. 710/305
2002/0027877 A1 * 3/2002 Son et al. .................. 370/218
2003/0217324 A1 * 11/2003 Nielsen et al. ............. 714/776

FOREIGN PATENT DOCUMENTS

| JP | 57-194647 | 11/1982 |
| JP | 4-156741 | 5/1992 |
| JP | 04-230141 | 8/1992 |
| JP | 05-250302 | 9/1993 |

OTHER PUBLICATIONS

Regula, Jack, et al., "Ringed Bus Puts a Twist on Switching," Oct. 23, 2000, Electronic Engineering Times, p. 105, 138, 172 (3 pages).*

Merriam-Webster Online Dictionary, available at www.m-w.com, last accessed Jun. 28, 2005.*

* cited by examiner

| DESTINATION / SOURCE | F1 | F2 | F3 | F4 | F5 | F6 | F7 | F8 | F9 | F10 | F11 |
|---|---|---|---|---|---|---|---|---|---|---|---|
| F0 | X | X | X | X | X | X | O | O | O | O | O |

⇩ LOADING OF BUS SELECTION TABLE

US 7,051,132 B2

BUS SYSTEM AND PATH DECISION METHOD THEREFOR

CROSS-REFERENCE TO RELATED APPLICATIONS

This application claims the priority of Korean Patent Application No. 2002-2264, filed Jan. 15, 2002, which is incorporated herein in its entirety by reference.

BACKGROUND OF THE INVENTION

1. Field of the Invention

The present invention relates to a bus system, and more particularly, to a bus system suitable for a system-on-chip and a path decision method therefor.

2. Description of the Related Art

Conventional bus systems have been developed as systems outside chips mounted on a board. However, due to advances in semiconductor manufacturing technology, the development and use of system-on-chips, in which a majority of functional blocks are implemented on a single chip, is gradually increasing.

Bus systems outside chips are being applied to system-on-chips in an early stage without modification. Since such a system-on-chip has smaller wire characteristics, i.e., inductance L, resistance R, and capacitance C, than those of a gate, a high-speed system can be made using the structure of a conventional bus system.

As chips such as very deep sub-micron (VDSM) chips and ultra deep sub-micron (UDSM) chips having very narrow wires for connecting functional blocks are manufactured on a large scale with the development of micro processing technology, the time taken for a signal to pass through the functional blocks is reduced. However, a wire delay that was ignored in the past becomes more important than a cell delay and it is difficult to predict the influence which the wire delay exerts on system performance at an early stage of a design. Accordingly, when a conventional bus system designed without an in depth consideration of a wire delay is applied to a system-on-chip as it is, the entire system performance may be degraded. In the case of a system-on-chip, the entire chip performance heavily depends on the efficiency of a bus structure taking charge of data transmission, so bus systems for system-on-chips have been actively researched.

SUMMARY OF THE INVENTION

The present invention provides a bus system of a new structure for a system-on-chip.

The present invention also provides a bus system having an improved wire delay performance.

The present invention also provides a method of deciding a data transmission path to implement the bus system on a chip, that is, a method of generating a bus selection table.

According to an aspect of the present invention, there is provided a bus system including a plurality of functional blocks; a ring bus which transmits data in a single direction; an arbiter which generates a bus grant signal according to a predetermined algorithm in response to a bus request from one of the functional blocks; and a plurality of bus connectors each of which connects a corresponding functional block to the ring bus, transmits data from the corresponding functional block to the ring bus, and transmits data from the ring bus to the corresponding functional block.

Preferably, each of the bus connectors includes a multiplexer, which receives data from the ring bus and data from a corresponding functional block and outputs one of the received data to the ring bus in response to a control signal received from the arbiter, and the arbiter receives a bus request from one of the functional blocks and sends the bus grant to the corresponding functional block through a path which is separate from the ring bus.

According to another aspect of the present invention, there is provided a bus system including a ring bus; a plurality of functional blocks which are connected to the ring bus and transmit and receive data through the ring bus; and at least one short-cut bus which is separate from the ring bus and transmits data from one of the functional blocks to another functional block.

Preferably, the ring bus and short-cut bus transmit data in a single direction.

Preferably, the functional blocks include a first functional block comprising an incoming path and an outgoing path which are connected to the ring bus; a second functional block which comprises an incoming path connected to the ring bus and outgoing paths respectively connected to the ring bus and the short-cut bus and outputs data from the ring bus to the short-cut bus or the ring bus; and a third functional block which comprises incoming paths respectively connected to the ring bus and the short-cut bus and an outgoing path connected to the ring bus and outputs data from the ring bus or data from the short-cut bus to the ring bus.

According to still another aspect of the present invention, there is provided a bus system including a plurality of functional blocks; a ring bus comprising a plurality of nodes; at least one short-cut bus which directly connects one node of the ring bus to another node of the ring bus; a first bus connector which connects a functional block to a node of the ring bus; and a second bus connector which connects a functional block to a node connected to the short-cut bus.

Preferably, the bus system also includes an arbiter which generates a bus grant signal according to a predetermined algorithm in response to a bus request from one of the functional blocks. Each of the first and second bus connectors outputs data from the corresponding functional block to the ring bus or the short-cut bus in response to the bus grant signal received from the arbiter.

Preferably, the second bus connector includes a fan-out connector comprising an incoming path connected to the ring bus and outgoing paths respectively connected to the ring bus and the short-cut bus, and a merge connector comprising incoming paths respectively connected to the ring bus and the short-cut bus and an outgoing path connected to the ring bus.

The fan-out connector outputs received data to one of the ring bus and the short-cut bus, in response to a control signal received from the arbiter. The merge connector receives data from one of the ring bus and the short-cut bus and outputs the data to the ring bus, in response to a control signal received from the arbiter.

The arbiter receives a bus request from each of the functional blocks and sends the bus grant signal to the corresponding functional block through a path which is separately formed from the ring bus and the short-cut bus.

There is also provided a system-on-chip on which one of the bus systems provided above is laid out.

According to still another aspect of the present invention, there is provided a method of selecting a path through which data is transmitted from one functional block to another functional block in a bus system including a plurality of functional blocks, a ring bus including a plurality of nodes, at least one short-cut bus which directly connects one node of the ring bus to another node of the ring bus, a fist bus connector which connects a functional block to a node of the ring bus, and a second bus connector which connects a functional block to a node connected to the short-cut bus. The method includes (a) synthesizing the bus system; (b) laying out the bus system; (c) simulating a case where the short-cut bus is used when data is transmitted from each of the functional blocks to another functional block and a case where the short-cut bus is not used and selecting one case based on the result of simulation; and (d) loading a bus selection table, which is obtained in step (c) to be referred to for selection of a bus, into the arbiter.

BRIEF DESCRIPTION OF THE DRAWINGS

The above aspects and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the attached drawings.

Figure 1:
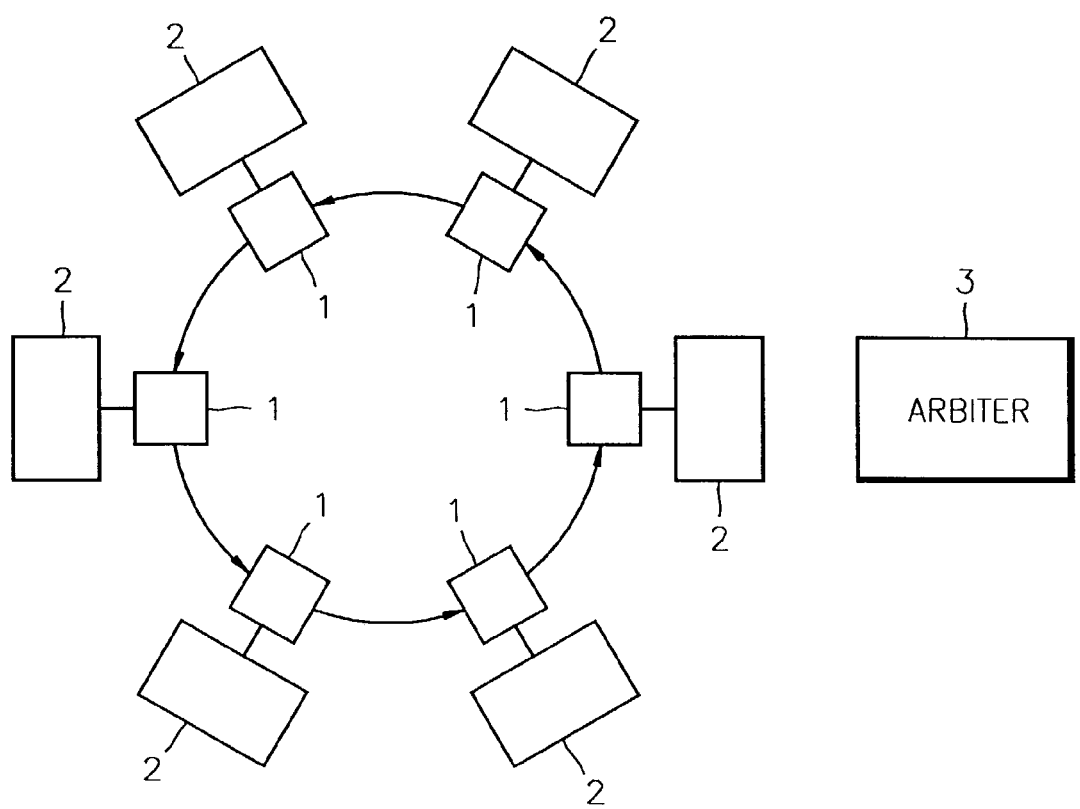
FIG. 1 is a block diagram of a bus system according to a first embodiment of the present invention.

FIG. 1 is a block diagram of a bus system according to a first embodiment of the present invention. Referring to FIG. 1, the bus system includes as a common bus a ring bus of a circular structure in which data is transmitted in a single direction. A plurality of nodes are provided in the ring bus, and functional blocks 2 are physically connected to the ring bus via corresponding bus connectors 1 at the respective nodes. The bus connectors 1 receive data from the ring bus or by-pass data and receive data from the corresponding functional blocks 2 and output the data in response to a control signal output from an arbiter 3. The arbiter 3 is physically connected to each of the functional blocks 2 through a separate path from the ring bus and generates a bus grant according to a predetermined algorithm in response to a bus request from a functional block 2. The arbiter 3 arbitrates bus requests so that the plurality of functional blocks 2 can share the ring bus. The arbiter 3 employs a conventional algorithm such as a priority arbitration method, a first-in first-served (FIFS) method, a daisy-chain method, a round-robin method or algorithms to be developed in the future.

Figure 2:
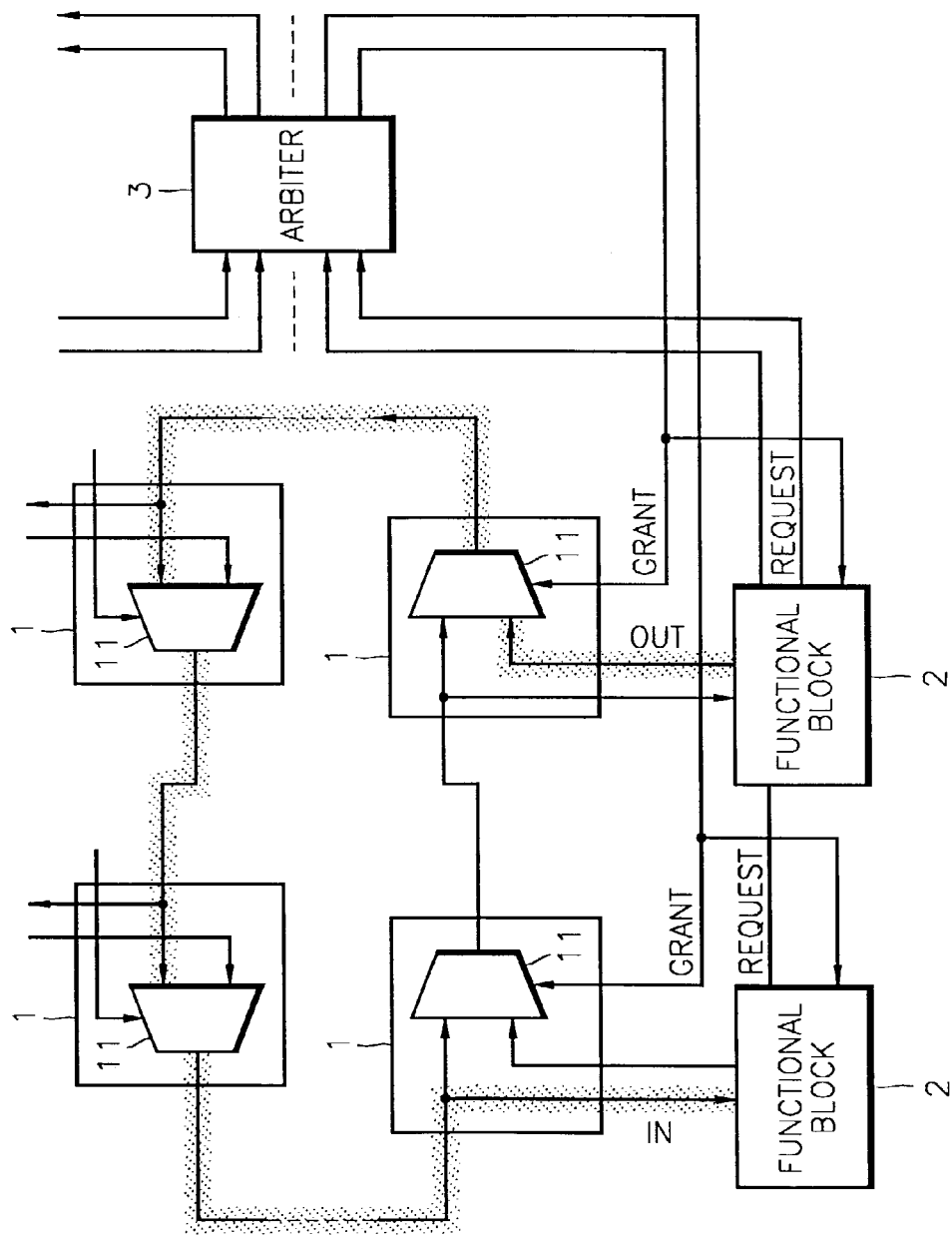
FIGS. 2 through 4 are diagrams showing an example of the bus system shown in FIG. 1.
Figure 3:
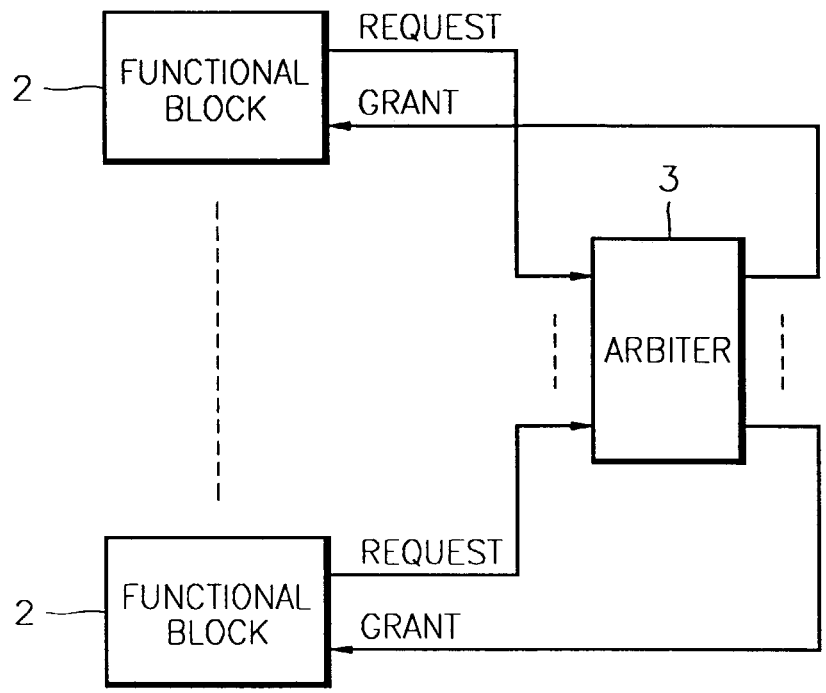
Figure 4:
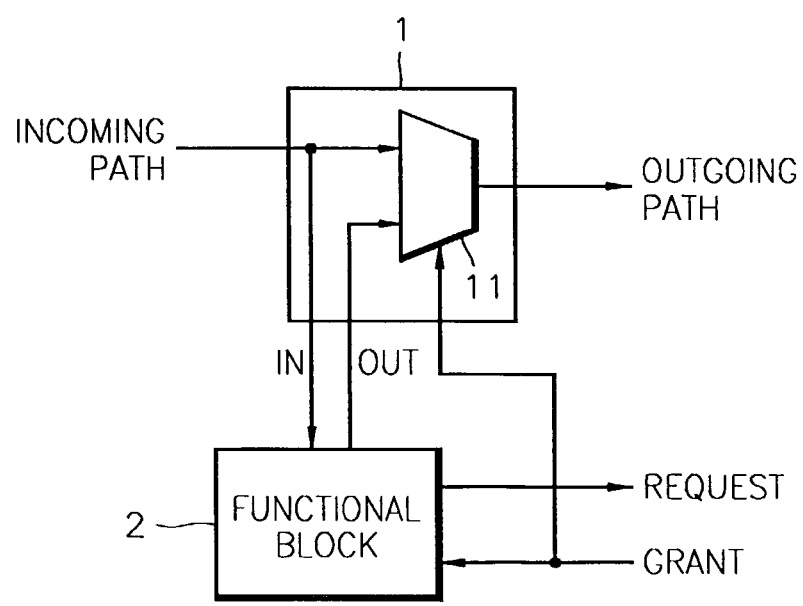

FIGS. 2 through 4 are diagrams showing an example of the bus system shown in FIG. 1. The same reference numerals denote blocks having the same functions, and thus descriptions thereof will be omitted.

Referring to FIGS. 2 and 3, each of the functional blocks 2 is connected to an arbiter 3 through a physically separate path from a ring bus. When there is data to be transmitted, a functional block 2 sends a bus request signal REQUEST to the arbiter 3. Then, the arbiter 3 sends a bus grant signal GRANT to the corresponding functional block 2 according to a predetermined algorithm.

Referring to FIGS. 2 and 4, a bus connector 1 includes an incoming path and an outgoing path which are connected to the ring bus. In addition, the bus connector 1 is connected to a corresponding functional block 2 and transmits data to the functional block 2 or receives data from the functional block 2. Furthermore, each of the bus connectors 1 includes a multiplexer 11 which outputs either data from the ring bus or data from the functional block 2. The multiplexer 11 outputs data received from the functional block 2 to the outgoing path in response to a bus grant signal GRANT received from the arbiter 3. When data is input from the incoming path connected to the ring bus to the multiplexer 11 in a state where a bus grant signal GRANT is not input to the multiplexer 11, the multiplexer 11 outputs the data to the outgoing path.

Figure 5:
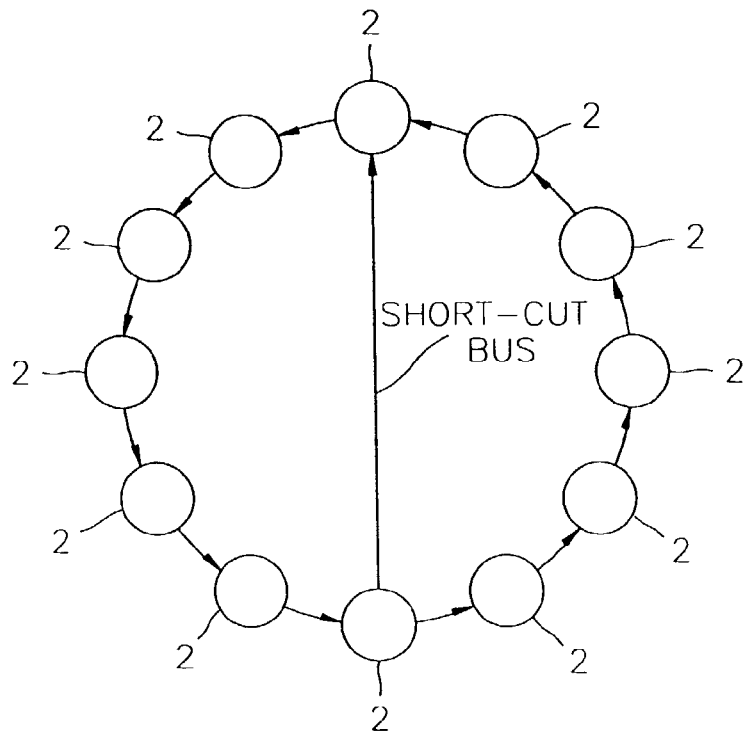
FIGS. 5 through 7 are diagrams of bus systems according to second through fourth embodiments of the present invention.
Figure 6:
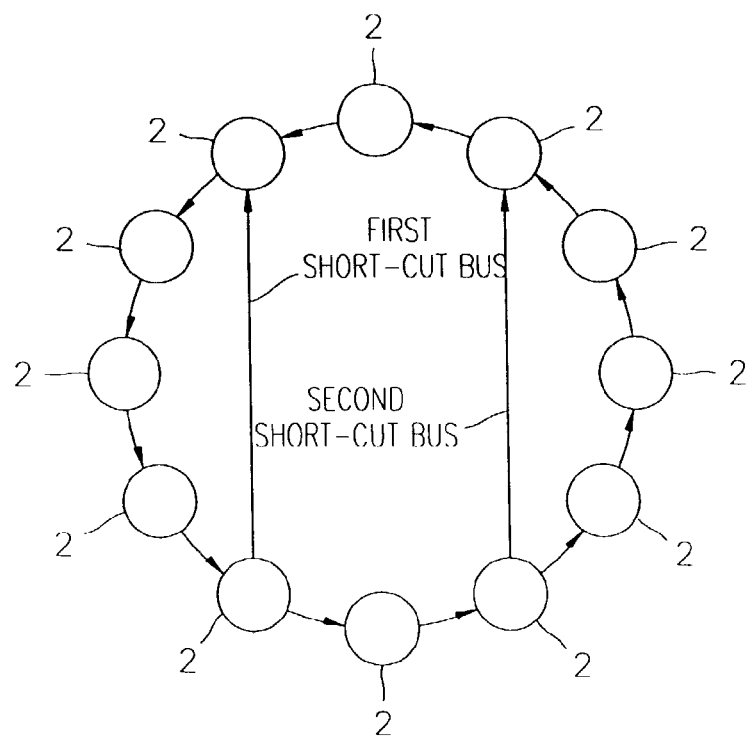
Figure 7:
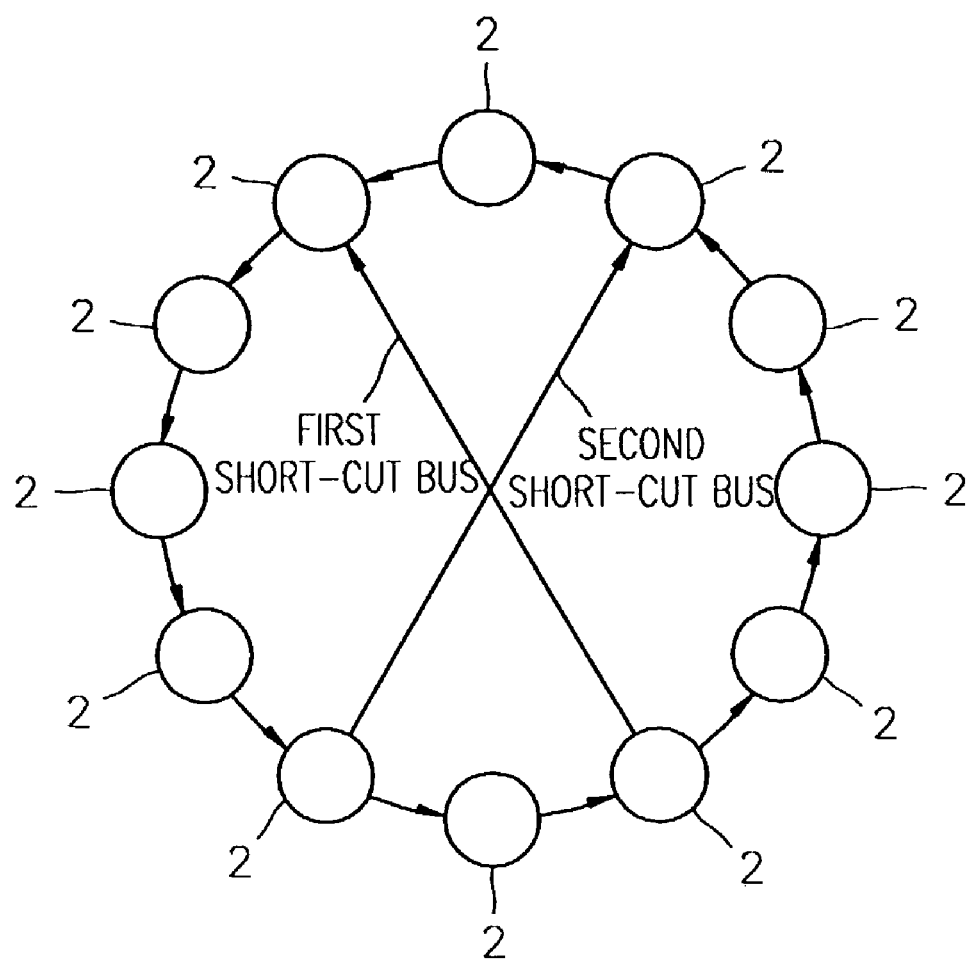

FIGS. 5 through 7 are diagrams of bus systems according to second through fourth embodiments of the present invention. In FIGS. 1 and 5 through 7, the same reference numerals denote blocks having the same functions as those shown in FIG. 1, and descriptions thereof will be omitted.

Referring to FIG. 5, a bus system includes as a common bus a ring bus of a circular structure in which data is transmitted in a single direction. A plurality of functional blocks 2 are physically connected to the ring bus. A short-cut bus is formed to be physically separate from the ring bus. The short-cut bus starts from a node connected to a certain functional block 2 and ends at a node connected to another functional block 2. The short-cut bus is provided for compensating for performance degradation arising from a cell delay due to the functional blocks 2 arranged in series. A system designer decides which nodes to put the short-cut bus between. In order to decide where to put the short-cut bus, all of the functional blocks 2 are disposed on a chip, and the time required for data transmission is simulated. The position of the short-cut bus is decided based on the result of simulation.

The functional blocks 2 transmit data through the short-cut bus and/or the ring bus. A variety of methods can be used to allow the functional blocks 2 to share the bus, such as an arbitration method through an arbiter, as shown in FIG. 1, a method of using tokens indicating the right to use the bus in regular order, or an Ethernet method.

Referring to FIG. 6, a bus system includes as a common bus a ring bus of a circular structure in which data is transmitted in a single direction. A plurality of functional blocks 2 are physically connected to the ring bus. Short-cut buses are formed to be physically separate from the ring bus. First and second short-cut buses start from nodes connected to different functional blocks 2, respectively, and end at nodes connected to different functional blocks 2, respectively. The functional blocks 2 transmit data through at least one among the first and second short-cut buses and the ring bus. As described above, a variety of methods can be used to allow the functional blocks 2 to share the bus.

Referring to FIG. 7, a bus system includes as a common bus a ring bus of a circular structure in which data is transmitted in a single direction. A plurality of functional blocks 2 are physically connected to the ring bus. First and second short-cut buses are formed to start from nodes connected to different functional blocks 2, respectively, and end at nodes connected to different functional blocks 2, respectively. In FIG. 7, although the first and second short-cut buses look like they are connected, they are electrically isolated since they are formed on different layers on a system-on-chip having a multi-layer structure. The functional blocks 2 transmit data through at least one among the first and second short-cut buses and the ring bus. As described above, a variety of methods can be used to allow the functional blocks 2 to share the bus.

Figure 8:
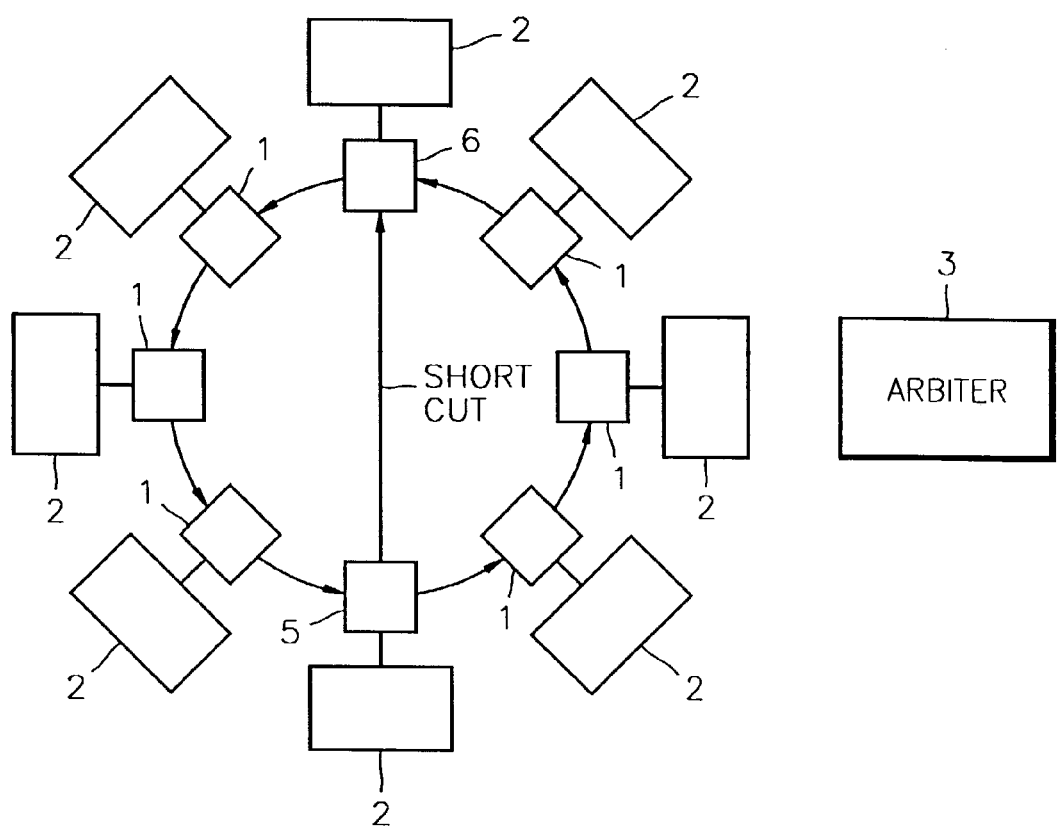
FIG. 8 is a diagram of an example of the bus system shown in FIG. 5.

FIG. 8 is a diagram of an example of the bus system shown in FIG. 5. In FIGS. 5 and 8, the same reference numerals denote blocks having the same functions, and descriptions thereof will be omitted.

Referring to FIG. 8, the bus system includes a ring bus of a circular structure in which data is transmitted in a single direction and a short-cut bus. The bus system also includes a plurality of functional blocks 2, and each of the functional blocks 2 is physically connected to the ring bus and/or the short-cut bus through one among three types of bus connectors 1, 5, and 6. Each of the bus connectors 1 has an incoming path and an outgoing path, which are connected to the ring bus, and connects a corresponding functional block 2 to only the ring bus. The bus connector 5 is a fan-out connector having an incoming path connected to the ring bus and two outgoing paths, one connected to the short-cut bus and the other connected to the ring bus. The bus connector 6 is a merge connector having two incoming paths, one connected to the ring bus and the other connected to the short-cut bus, and one outgoing path connected to the ring bus.

An arbiter 3 is connected to each of the functional blocks 2 through a physically separate path from the ring bus and outputs a bus grant signal GRANT according to a predetermined algorithm in response to a bus request from each of the functional blocks 2. The arbiter 3 allows the plurality of functional blocks 2 to share the ring bus. The arbiter 3 employs a conventional algorithm such as a priority arbitration method, a FIFS method, a daisy-chain method, a round robin method or an algorithm to be developed in the future. In addition, the arbiter 3 sends a control signal to the connectors 5 and 6 connected to the short-cut bus to report whether the short-cut bus is to be used to transmit predetermined data.

Figure 9:
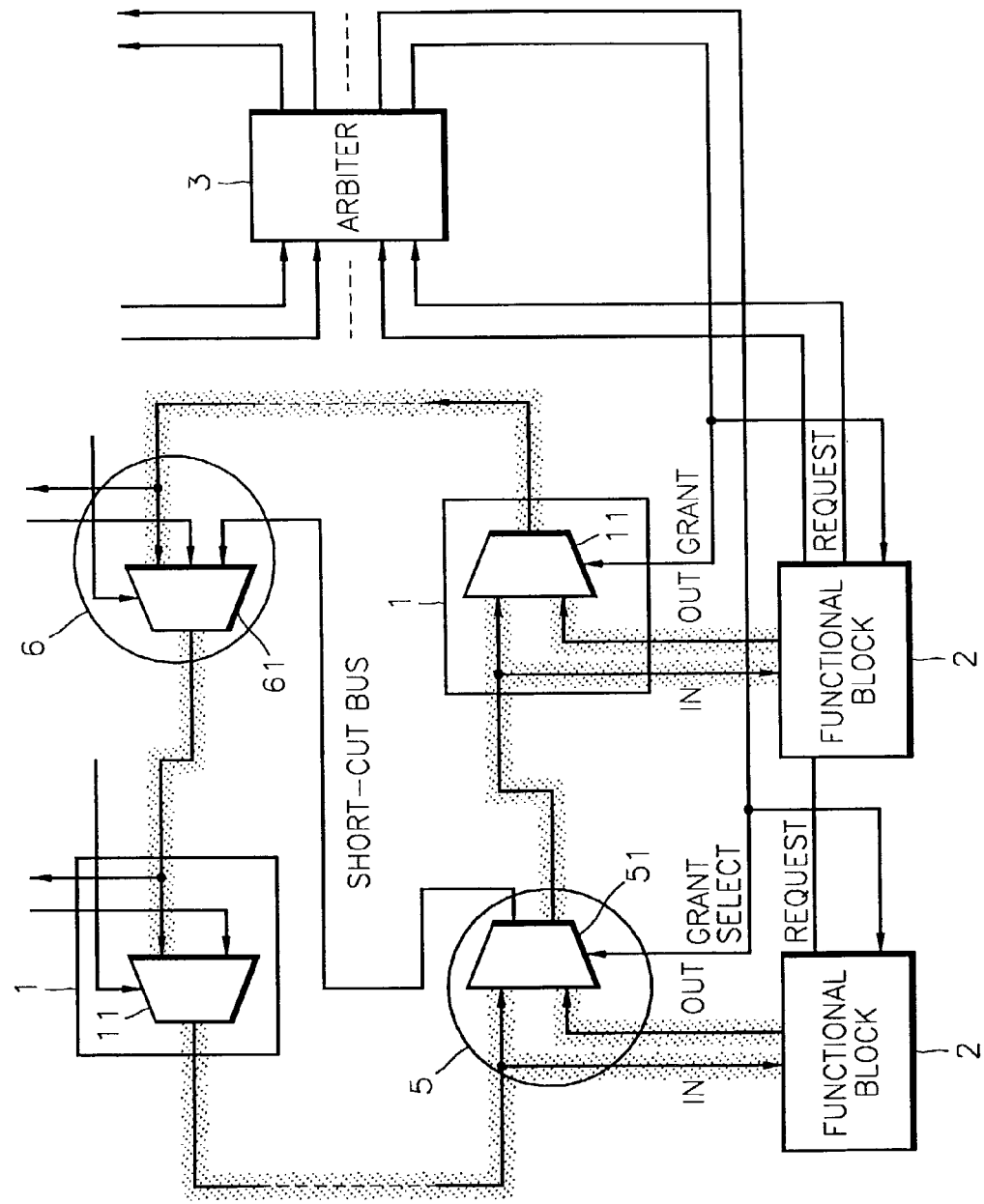
FIG. 9 is a diagram of an example of the bus system shown in FIG. 8.

FIG. 9 is a diagram of an example of the bus system shown in FIG. 8. In FIGS. 8 and 9, the same reference numerals denote blocks having the same functions, and descriptions thereof will be omitted.

Referring to FIG. 9, each of the functional blocks 2 is connected to an arbiter 3 through a physically separate path from a ring bus. Each of the functional blocks 2 sends a bus request signal REQUEST to the arbiter 3 when there is data to be transmitted. Then, the arbiter 3 outputs a bus grant signal GRANT to the corresponding functional block 2 and bus connectors 1, 5, and 6 according to a predetermined algorithm. In addition, the arbiter 3 outputs a selection signal SELECT for selecting one of the short-cut bus and the ring bus to the bus connectors that are connected to both short-cut bus and ring bus, i.e., the fan-out connector 5 and the merge connector 6.

Each of the bus connectors 1 connects a corresponding functional block 2 to only the ring bus and includes a multiplexer 11 which outputs one of data received from the ring bus and data received from the functional block 2. The fan-out connector 5 connects a corresponding functional block 2 to both the ring bus and the short-cut bus and includes a multiplexer 51 which outputs one of data received from the ring bus and data received from the corresponding functional block 2 to one of the short-cut bus and the ring bus in response to a selection signal SELECT and/or a bus grant signal GRANT received from the arbiter 3. The merge connector 6 connects a corresponding functional block 2 to both the ring bus and the short-cut bus and includes a multiplexer 61 which outputs one of data received from the short-cut bus and data received from the corresponding functional block 2 to the ring bus in response to a selection signal SELECT and/or a bus grant signal GRANT received from the arbiter 3.

Figure 10A:
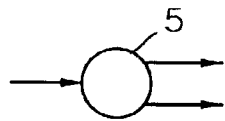
FIGS. 10A and 10B are detailed circuit diagrams of a fan-out connector of FIG. 9.
Figure 10B:
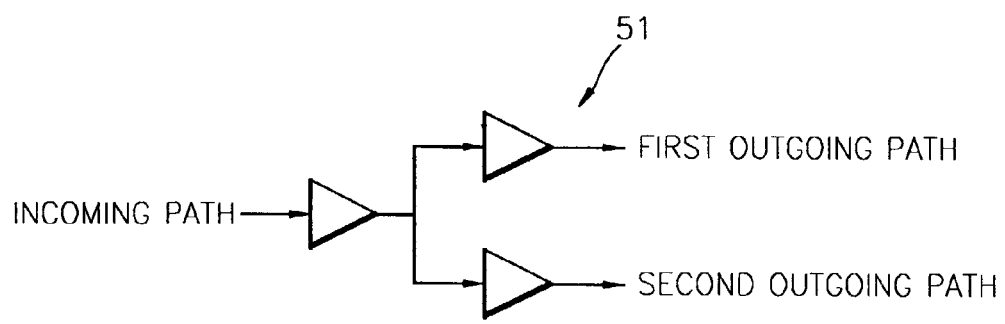

FIGS. 10A and 10B are detailed circuit diagrams of the fan-out connector 5 of FIG. 9. Referring to FIGS. 10A and 10B, the fan-out connector 5 includes the multiplexer 51 having one incoming path connected to the ring bus and two first and second outgoing paths, one connected to the short-cut bus and the other connected to the ring bus. A selection signal SELECT for selecting one of the two outgoing paths is transmitted from the arbiter 3. One of the first and second outgoing paths is connected to the ring bus, and the other is connected to the short-cut bus.

Figure 11A:
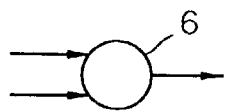
FIGS. 11A and 11B are detailed circuit diagrams of a merge connector of FIG. 9.
Figure 11B:
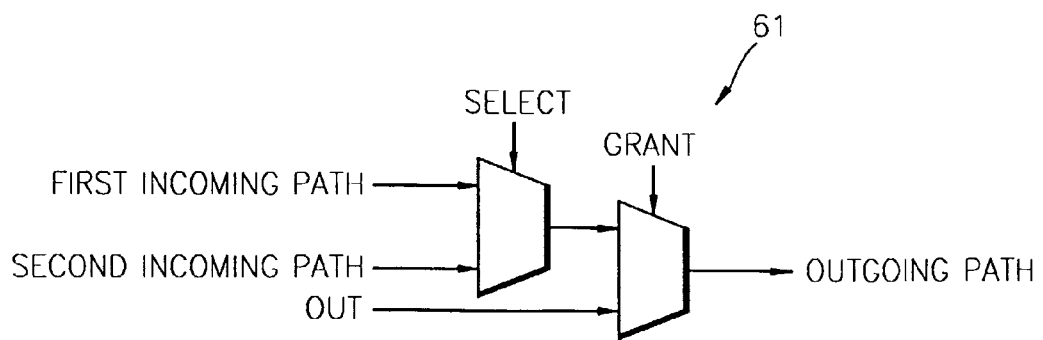

FIGS. 11A and 11B are detailed circuit diagrams of the merge connector 6 of FIG. 9. Referring to FIGS. 11A and 11B, the merge connector 6 includes the multiplexer 61 having a first and a second incoming path connected to the ring bus and the short-cut bus, respectively, and one outgoing path connected to the ring bus. The multiplexer 61 outputs one of data received through the first incoming path and data received through the second incoming path in response to a selection signal SELECT received from the arbiter 3 and outputs one of the selected data and data received from the corresponding functional block 2 in response to a bus grant signal GRANT. One of the first and second incoming paths is connected to the ring bus, and the other is connected to the short-cut bus.

Figure 12:
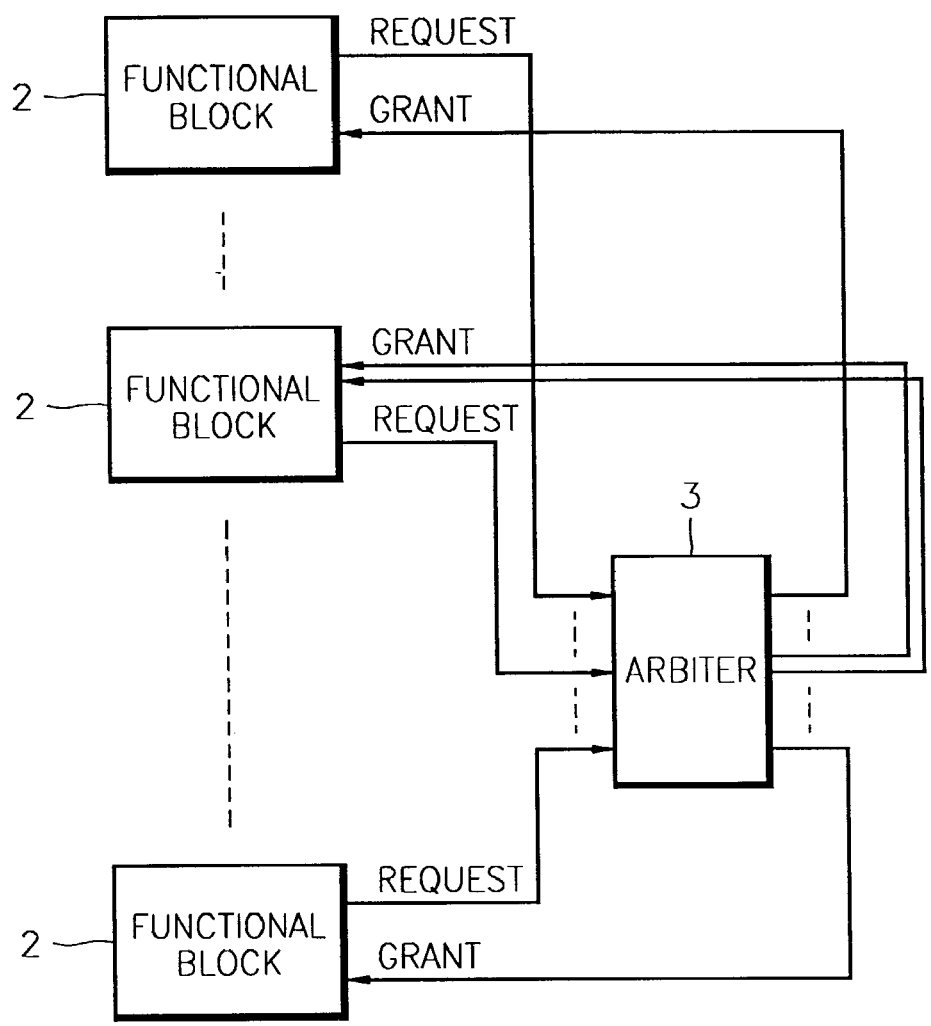
FIG. 12 is a block diagram for explaining an arbiter of FIG. 9.

FIG. 12 is a block diagram for explaining the operation of the arbiter 3 of FIG. 9. Referring to FIG. 12, the arbiter 3 is connected to each of the functional blocks 2 through a separate path from the ring bus and the short-cut bus. After each of the functional blocks 2 sends a bus request signal REQUEST to the arbiter 3, the arbiter 3 sends a bus grant signal GRANT to the corresponding functional block 2 according to a predetermined algorithm.

Figures 13A, 13B:
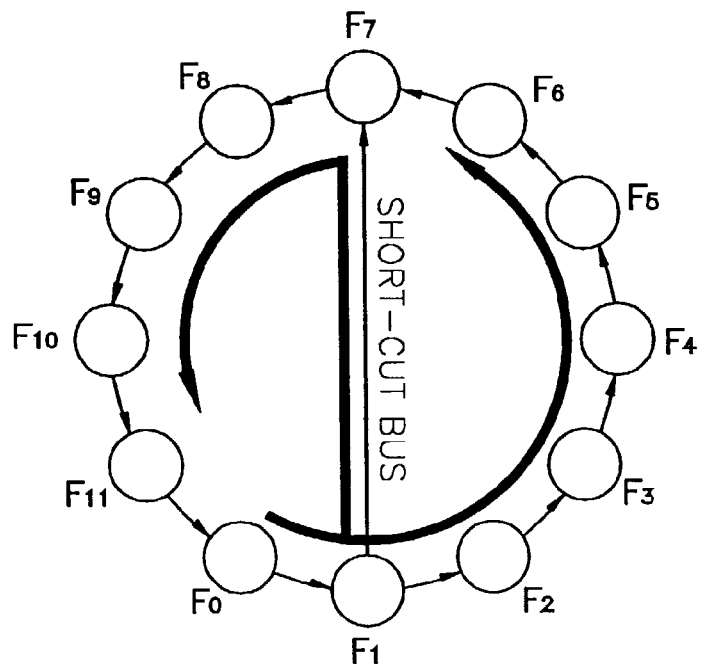
FIGS. 13A and 13B are diagrams showing an example in which a short-cut bus is operated.
Figure 14A:
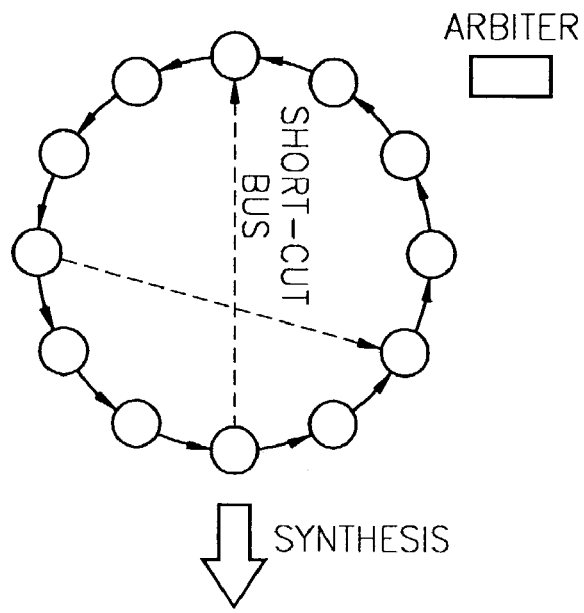
FIGS. 14(a)–14(d) are a diagram of a method of generating a bus selection table for an arbiter.
Figure 14B:
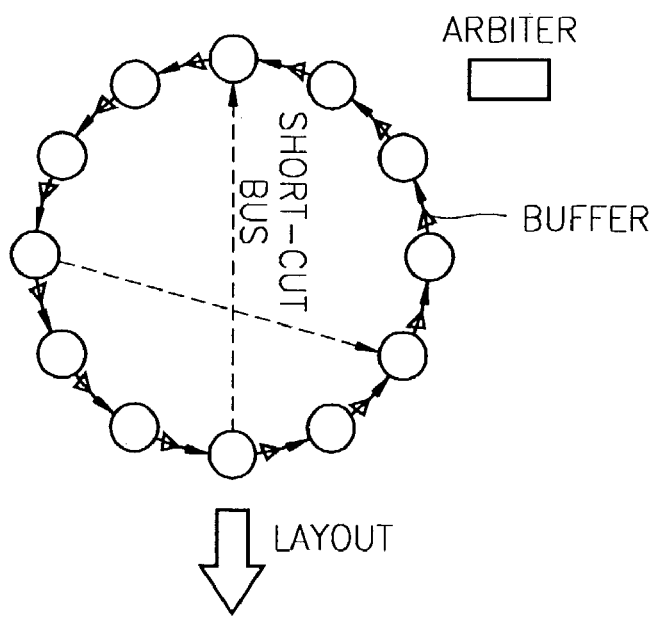
Figure 14C:
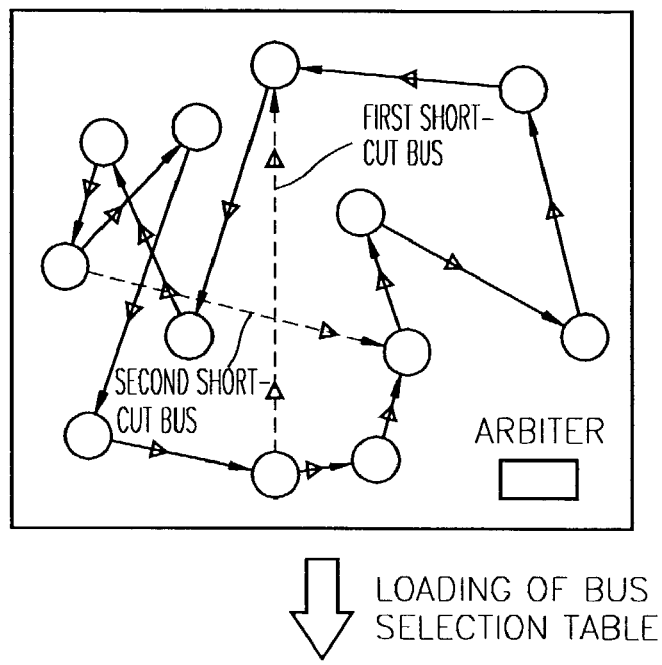
Figure 14D:
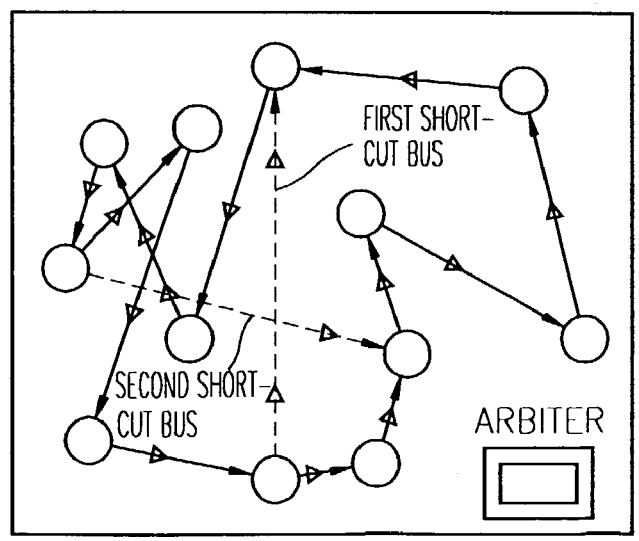

FIGS. 13A and 13B are diagrams showing an example in which a short-cut bus is operated. Referring to FIG. 13A, 12 functional blocks $F_0, F_1, \ldots, F_{11}$ are connected to a ring bus, and a short-cut bus is connected from the functional block $F_1$ to the functional block $F_7$. Data is transmitted counterclockwise through the ring bus and the short-cut bus.

Referring to FIG. 13B, when it is assumed that data is transmitted from the functional block $F_0$ to the functional blocks $F_1, F_2, \ldots, F_{11}$, use or nonuse of the short-cut bus is indicated by a "O" or a "X", respectively. In the case of the functional blocks $F_7, F_8, F_9, F_{10}$, and $F_{11}$, it is efficient to transmit the data through the short-cut bus, but it is not in the case of the functional blocks $F_1, F_2, F_3, F_4, F_5$, and $F_6$ referring to FIG. 13A. Accordingly, it is necessary to select use or nonuse of the short-cut bus.

In the present invention, the arbiter takes charge of selecting a path. In other words, the arbiter 3 sends a selection signal SELECT, which indicates whether the shortcut bus is to be used or not used, that is, indicates whether to output data to the short-cut bus and whether to receive data from the short-cut bus, to the fan-out connector 5 and the merge connector 6. To achieve this, the arbiter 3 is provided with a bus selection table, in which information about a path selected when data is transmitted from each of a plurality of functional blocks 2 to another functional block 2 is recorded, and outputs a selection signal SELECT referring to the bus selection table. In practice, when a bus system according to the present invention is implemented as a system-on-chip, it is unlikely that the ring bus will be exactly circular. Accordingly, even if it is inferred that data can be transmitted more quickly when a short-cut is used than when the short-cut is not used, it may not be the case in an actual implementation. Therefore, the bus selection data must be made based on the topology of the ring bus that is actually implemented on a chip.

FIG. 14 is a diagram of a method of generating a bus selection table for the arbiter 3. The structure of a bus system is logically completed, as shown in FIG. 14(a) and is changed into a structure shown in FIG. 14(b) through synthesis. Synthesis is performed directly by a circuit designer or using a variety of software tools. A trade-off between a cell delay and a wire delay is performed through synthesis, and a compensation circuit (such as a buffer) for compensating for a delay is added. After synthesis is completed, the bus system is laid out on a chip, as shown in FIG. 14(c). FIG. 14(c) shows the bus system that is actually laid out on a chip. As shown in FIG. 14(c), the ring bus may not have a circular shape when it is laid out on the chip. Accordingly, a bus selection table is made based on time information obtained by surveying the bus system laid out on the chip. A time required for transmitting data from a functional block to another functional block through a path which passes through a short-cut bus and a time required for transmitting the data from the former functional block to the latter functional block through a path which does not pass through a short-cut bus are experimentally measured or measured using a simulation, and information for selecting a path having less transmission delay between the two paths is recorded in the bus selection table. In other words, information about whether a short-cut bus is used or not when data is transmitted from a functional block to another functional block is recorded in the bus selection table. The completed bus selection table is loaded into the arbiter 3. As described above, the bus selection table can be generated without influencing other logics employed in the bus system and can be loaded into the arbiter 3. Thus, the arbiter 3 sends a selection signal SELECT to the fan-out connector 5 referring to the bus selection table in order to instruct to select one of the short-cut bus and the ring bus.

In order to examine whether the performance of a bus system having a ring bus according to the present invention is improved as compared to a conventional bus system, a transmission delay of a bus system employing a structure (tri-state method) in which each of a plurality of functional blocks is connected of a conventional linear-type common bus and transmission delay of a bus system according to the present invention will be theoretically calculated. The transmission delay of a bus system according to the present invention is expressed by Formula (1), and the transmission delay of a conventional bus system is expressed by Formula (2).

$$\text{Delay(proposed)} = K_p * \{(R_0 * C_0 + DC_0) + \ldots + (R_{n-1} * C_{n-1} + DC_{n-1})\} \quad (1)$$

Here, $K_p$ indicates a constant, $R_i (0 \leq i \leq n-1)$ indicates resistance of a functional block i $(0 \leq i \leq n-1)$, $C_i (0 \leq i \leq n-1)$ indicates capacitance, and $DC_i (0 \leq i \leq n-1)$ indicates a delay due to a cell such as a multiplexer within a connector. For simplification, it is assumed that $R_0$ through $R_{n-1}$, $C_0$ through $C_{n-1}$, and $DC_0$ through $DC_{n-1}$ are all the same.

$$\text{Delay(conventional)} = K_{c0} * 1 * 2 * R_0 * C_0 + \ldots + K_{c(n-1)} * n * (n-1) * R_{n-1} * C_{n-1} \quad (2)$$

Here, $K_{ci}$ indicates a constant, $R_i (0 \leq i \leq n-1)$ indicates resistance of a functional block i $(0 \leq i \leq n-1)$, $C_i (0 \leq i \leq n-1)$ indicates capacitance, and n indicates the number of functional blocks.

Formulas (1) and (2) are simplified into Formulas (3) and (4). Resistance R and capacitance C in a method according to the present invention are probably different than those in a conventional method, but it is assumed that they are similar for simplification of analysis.

$$\text{Delay(proposed)} = K_p * n * (R * C + DC) \quad (3)$$

$$\text{Delay(conventional)} = K_c * n * (n+1) * R * C \quad (4)$$

Subtraction of Formula (3) from Formula (4) is expressed by Formula (5).

$$\text{Delay(conventional)} - \text{Delay(proposed)} = (K_c - K_p) * n * R * C + \{K_c * (n+1) * R * C - K_p * DC\} * n = \{K_c * (n+1) * R * C - K_p * DC\} * n \quad (5)$$

Here, an improvement ratio is defined by Formula (6).

$$\text{Improvement Ratio} = K_c * (n+1) * R * C / K_p * DC \quad (6)$$

$$\approx K_i * (n+1) * (R * C / DC)$$

Accordingly, when the improvement ratio exceeds 1, it can be concluded that the bus system according to the present invention h as better performance than the conventional bus system. As line widths decrease due to the development of micro processing technology, wire delays become as important as cell delays. Accordingly, as the improvement ratio increases, the efficiency of a bus system according to the present invention also increases.

However, since a cell delay increases as the number of functional blocks increases, a short-cut bus is used in order to increase efficiency when the break-even point is exceeded or when a high-speed system is to be realized.

In the above embodiments, one or two short-cut buses are used, but the number of short-cut buses can be increased according to the number of functional blocks included in a bus system. When the number of short-cut buses becomes very large, a bus system according to the present invention has the same structure as a point-to-point bus system, so it is difficult to produce the effect of the present invention.

Each of the bus systems according to all of the above-described embodiments can be implemented as a system-on-chip.

In a conventional tri-state bus structure, the total wire length is short but transmission speed is slow, simultaneous transmission is impossible, the likelihood of transmission collision rapidly increases as the number of functional blocks increases, and it is complicated to test the efficiency of a completed system. Meanwhile, in a conventional point-to-point bus structure, transmission speed is fast and simultaneous transmission is possible, but the total wire length is long and rapidly increases as the number of functional blocks increases, which makes debugging difficult.

In contrast, the present invention combines the advantages of the conventional tri-state bus and point-to-point bus, thereby providing a bus system having a ring bus structure which can be easily laid out and has improved efficiency. In particular, the present invention employs a short-cut bus to improve a wire delay, thereby providing a bus system increasingly suitable for a system-on-chip.

What is claimed is:

1. A bus system comprising:
   a plurality of functional blocks;
   a ring bus which transmits data in a single direction;
   at least one short-cut bus which is separate from the ring bus and transmits data from one of the functional blocks to another of the functional blocks; and
   an arbiter which generates a bus grant signal according to a predetermined algorithm in response to a bus request from one of the functional blocks and determines whether the ring bus or the at least one short-cut bus is to be used for a requesting functional block.

2. The bus system of claim 1, further comprising a plurality of first type bus connectors connecting a corresponding functional block to the ring bus, transmitting data from the corresponding functional block to the ring bus, and transmitting data from the ring bus to the corresponding functional block, wherein each of the first type bus connectors comprises a multiplexer which receives data from the ring bus and data from a corresponding functional block and outputs one of the received data to the ring bus in response to a control signal received from the arbiter.

3. The bus system according to claim 2, further comprising a plurality of second type bus connectors connecting a corresponding functional block to the ring bus and a one of the at least one short cut buses.

4. The bus system of claim 1, wherein the arbiter receives a bus request from one of the functional blocks and sends the bus grant to the corresponding functional block through a path which is separate from the ring bus.

5. The bus system of claim 1, wherein each functional block is provided with only one corresponding connector, and wherein said each functional block transmits data to the ring bus and receives data from the ring bus via the corresponding connector.

6. The bus system according to claim 1, wherein the functional blocks are positioned within one apparatus.

7. The bus system according to claim 1, further comprising an arbiter receiving a bus request from a functional block from said plurality of functional block and determining whether the ring bus or the at least one short-cut bus is to be used for the functional block.

8. The bus system according to claim 7, wherein:
   when the arbiter receives the bus request from the first function block or the third functional block, the arbiter generates a bus grant signal according to a predetermined algorithm permitting the first function block to transmit data on a ring bus only, and
   when the arbiter receives the bus request from the second functional block, the arbiter generates the bus grant signal according to a predetermined algorithm and determines which of the two outgoing paths the second functional block is to use to transmit the data.

9. A bus system comprising:
   a ring bus;
   a plurality of functional blocks which are connected to the ring bus and transmit and receive data through the ring bus;
   at least one short-cut bus, which is separate from the ring bus and transmits data from one of the functional blocks to another of the functional blocks;
   an arbiter which generates a bus grant signal according to a predetermined algorithm in response to a bus request from one of the functional blocks and determines whether the ring bus or the at least one short-cut bus is to be used for a requesting functional block,
   wherein the plurality of functional blocks comprise:
      a first functional block only connected to the ring bus via an incoming path and an outgoing path;
      a second functional block which comprises an incoming path only connected to the ring bus and outgoing paths respectively connected to the ring bus and the short-cut bus and outputs data from the ring bus to the short-cut bus or the ring bus; and
      a third functional block which comprises incoming paths respectively connected to the ring bus and the short-cut bus and an outgoing path only connected to the ring bus and outputs data from the ring bus or data from the short-cut bus to the ring bus.

10. The bus system of claim 9, wherein the ring bus and short-cut bus transmit data in a single direction.

11. A bus system comprising:
   a plurality of functional blocks;
   a ring bus transmitting data and comprising a plurality of nodes;
   at least one short-cut bus transmitting the data and which directly connects one node of the ring bus to another node of the ring bus;
   a first bus connector, which connects a first of the plurality of functional blocks to a first node, the first node being one of the plurality of nodes of the ring bus;
   a second bus connector which connects a second of the plurality of functional blocks to a second node connected to the short-cut bus, the second node being one of the plurality of nodes of the ring bus; and
   an arbiter which generates a bus grant signal according to a predetermined algorithm in response to a bus request from one of the functional blocks and determines whether the ring bus or the at least one short-cut bus is to be used for a requesting functional block,
   wherein, when receiving a predetermined signal, data received from the ring bus is transmitted via the short-cut bus.

12. The bus system of claim 11, wherein the ring bus and short-cut bus transmit data in a single direction.

13. The bus system of claim 12, wherein each of the first and second bus connectors outputs data from the corresponding functional block to the ring bus or the short-cut bus in response to the bus grant signal received from the arbiter.

14. The bus system of claim 13, wherein the second bus connector comprises:
   a fan-out connector comprising an incoming path connected to the ring bus and outgoing paths respectively connected to the ring bus and the short-cut bus; and
   a merge connector comprising incoming paths respectively connected to the ring bus and the short-cut bus and an outgoing path connected to the ring bus.

15. The bus system of claim 14, wherein the fan-out connector outputs received data to one of the ring bus and the short-cut bus, in response to a control signal received from the arbiter.

16. The bus system of claim 15, wherein the merge connector receives data from one of the ring bus and the short-cut bus and outputs the data to the ring bus, in response to a control signal received from the arbiter.

17. The bus system of claim 13, wherein the arbiter receives a bus request from each of the functional blocks and sends the bus grant signal to the corresponding functional block through a path which is separately formed from the ring bus and the short-cut bus.

18. A system-on-chip on which a bus system is laid out, the bus system comprising:
a plurality of functional blocks;
a ring bus transmitting data and comprising a plurality of nodes;
at least one short-cut bus transmitting the data and which directly connects one of the plurality of nodes of the ring bus to another node thereof;
a first bus connector, which connects a first of the plurality of functional blocks to a first node, the first node being one of the plurality of nodes of the ring bus;
a second bus connector which connects a second of the plurality of functional blocks to a second node connected to the short-cut bus, the second node being one of the plurality of nodes of the ring bus; and
an arbiter which generates a bus grant signal according to a predetermined algorithm in response to a bus request from one of the functional blocks and determines whether the ring bus or the at least one short-cut bus is to be used for a requesting functional block.

19. The system-on-chip of claim 18, wherein the ring bus and short-cut bus transmit data in a single direction.

20. The system-on-chip of claim 18, wherein each of the first and second bus connectors outputs data from the corresponding functional block to the ring bus or the short-cut bus in response to the bus grant signal received from the arbiter.

21. The system-on-chip of claim 20, wherein the second bus connector comprises:
a fan-out connector comprising an incoming path connected to the ring bus and outgoing paths respectively connected to the ring bus and the short-cut bus; and
a merge connector comprising incoming paths respectively connected to the ring bus and the short-cut bus and an outgoing path connected to the ring bus.

22. The system-on-chip of claim 21, wherein the fan-out connector outputs received data to one of the ring bus and the short-cut bus, in response to a control signal received from the arbiter.

23. The system-on-chip of claim 21, wherein the merge connector receives data from one of the ring bus and the short-cut bus and outputs the data to the ring bus, in response to a control signal received from the arbiter.

24. A method of selecting a path through which data is transmitted from one functional block to another functional block in a bus system including a plurality of functional blocks, a ring bus comprising a plurality of nodes, at least one short-cut bus which directly connects one node of the ring bus to another node of the ring bus, a first bus connector which connects a functional block to a node of the ring bus, and a second bus connector which connects a functional block to a node connected to the short-cut bus, the method comprising the steps of:
(a) synthesizing the bus system;
(b) laying out the bus system;
(c) simulating a case where the short-cut bus is used when data is transmitted from each of the functional blocks to another of the functional blocks and a case where the short-cut bus is not used and selecting one case based on the result of simulation; and
(d) loading a bus selection table, which is obtained in step (c) to be referred to for selection of a bus, into an arbiter, the arbiter determines whether the ring bus or the at least one short-cut bus is to be used for a requesting functional block.

25. A bus system comprising:
a ring bus;
at least one short-cut bus which is separate from the ring bus;
a plurality of functional blocks which are connected to the ring bus and some of which are connected to the at least one short-cut bus; and
an arbiter which generates a bus grant signal according to a predetermined algorithm in response to a bus request from one of the functional blocks and determines whether the ring bus or the at least one short-cut bus is to be used for a requesting functional block,
wherein data is transmitted and received via the ring bus and the at least one short-cut bus, and
wherein at least some of the data received from the ring bus is transmitted on the at least one short-cut bus.

26. The bus system according to claim 25, wherein a functional block from said plurality of functional block is connected via a connector to the ring bus or to both the ring bus and the short-cut bus, and wherein type of connector provided for the functional block depends on whether a functional block is connected to only the ring bus or to both the ring bus and the at least one short-cut bus.

27. The bus system according to claim 25, wherein a functional block connected to both the ring bus and the short-cut bus is configured to receive the data from the ring bus and transmit the data via the short-cut bus or vise versa.

28. The bus system according to claim 25, further comprising a chip on which the plurality of functional blocks, the ring bus, and the short-cut bus are positioned.

29. The bus system according to claim 25, further comprising a VDSM or a UDSM chip on which the functional blocks are positioned.

* * * * *